Patented Oct. 18, 1927.

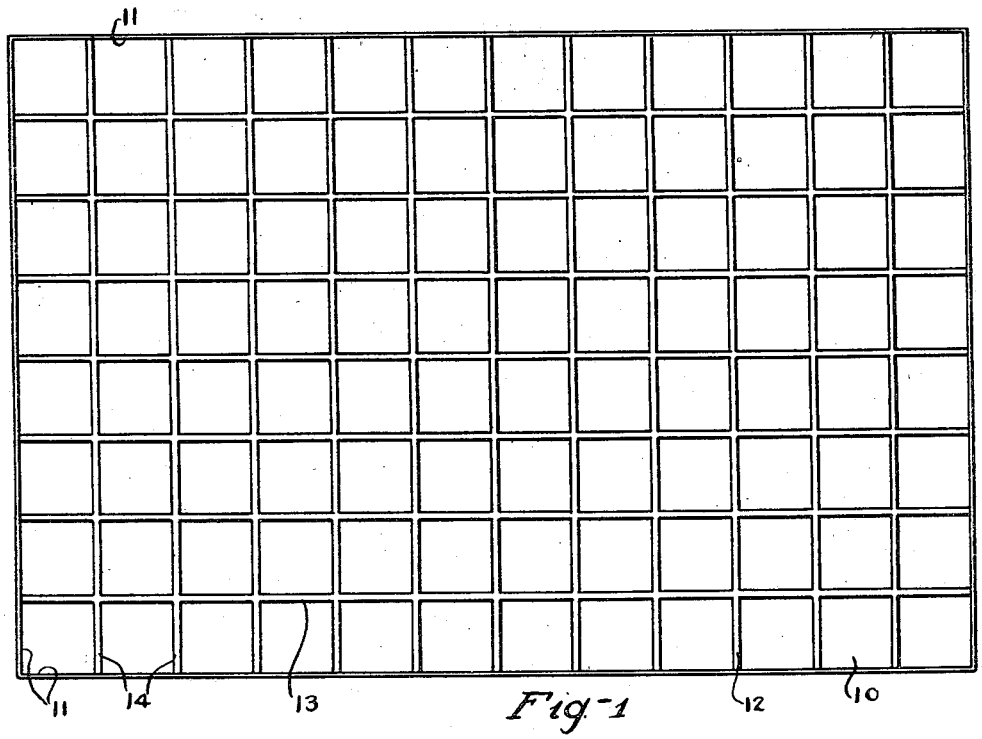
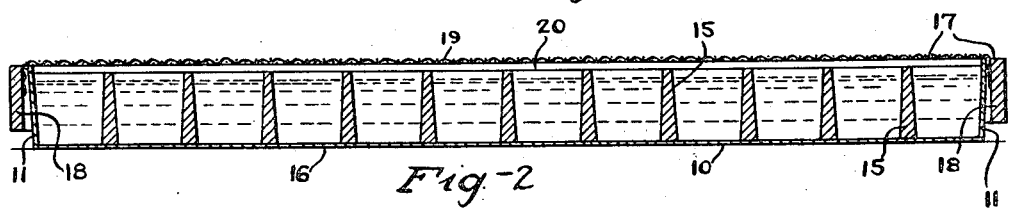
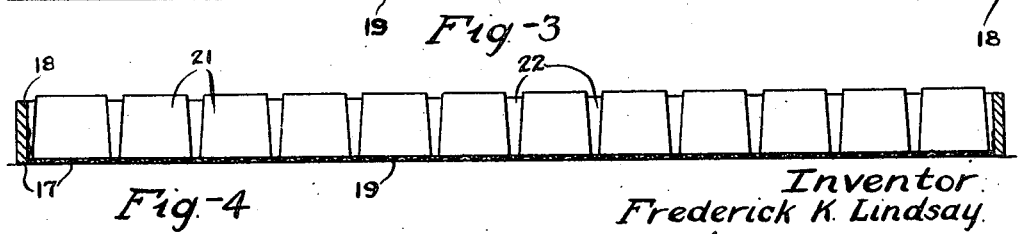

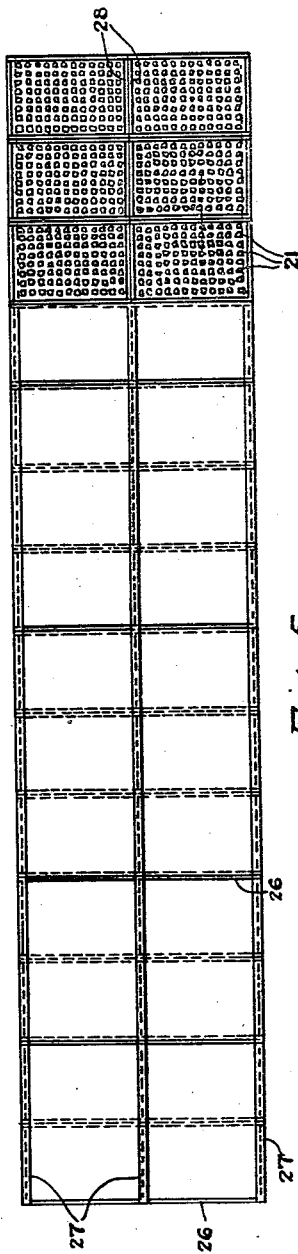
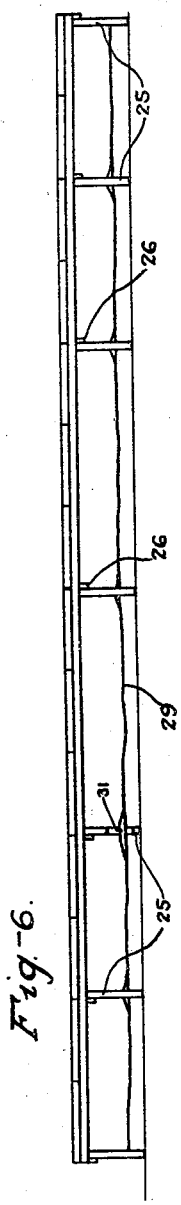
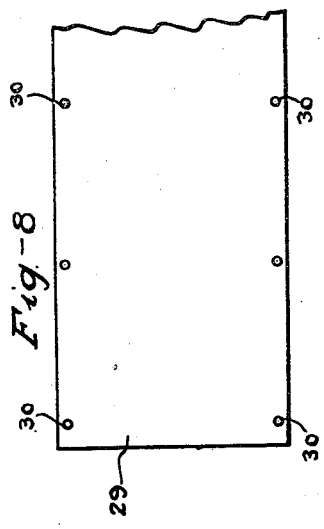
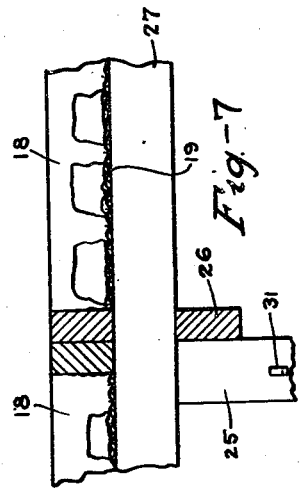

1,646,297

UNITED STATES PATENT OFFICE.

FREDERICK K. LINDSAY, OF ST. PAUL, MINNESOTA, ASSIGNOR TO ARIZONA MINERALS CORPORATION, OF ST. PAUL, MINNESOTA, A CORPORATION OF MINNESOTA.

PROCESS OF PREPARING A BASE EXCHANGE MATERIAL FROM GELS.

Application filed June 26, 1926. Serial No. 118,768.

My invention relates to the process of preparing a base exchange material from gels. This process is a carrying forward of the process described and claimed in my pending applications, Numbers 10,417 and 10,418, filed February 19, 1925. As pointed out in the said applications, a silica gel is formed by mixing a dissolved sodium silicate with a solution of sodium aluminate, stirring vigorously while these solutions are brought together to retard the formation of resultant gel, and during this period of retardation adding fine grain hard inert material, which is caught and held in suspension and forms the nuclei of the gel grains later developed by drying. In application No. 10,418 I describe and claim this process generally as applicable to any form of inert material. In application 10,417 I describe and claim the base exchanging material as being formed by the use of a combination of the gel and green sand, the green sand being used in the place of the inert material defined in application Serial Number 10,417. In the practice of this process, however, it is immaterial whether inert material or green sand has or has not been added to the gel before drying, since the process affects and determines the character of the finished gel product as a gel without regard to its containing nuclei of green sand or other inert material.

In the present process the aluminum silica gel is preliminarily formed and the inert material added in accordance with the steps of the processes of the above-identified applications. The particular features of my invention here described and claimed relate to the means of extracting the moisture from the gelling mass and of obtaining the final disintegrated particles ready for commercial use. I have discovered that if the soft gel mass, prior to its being hardened by drying, is first sub-divided into a multiplicity of small pieces and supported in that manner with air passages all about the pieces it may be properly dried by subjecting it to open air outdoor conditions without the use of either artificial temperature or forced drafts, the process working best in regions of relatively warm temperature and dry air, as, for example, parts of Arizona, New Mexico and southern California.

In carrying out the steps of my process I form the soft and undried gel into nearly cubical pyramidal frustrums each separated one from the other and supported on a mesh screen, said screens being held in racks so that the bottoms and tops thereof are exposed to the natural circulating air and the tops exposed to sunlight; and the gel masses so formed are subjected to atmospheric conditions for a suitable time, ranging from three to six days, according to the temperature and humidity of the air, when a most effective drying takes place.

In the drawings, representing a form of apparatus for effecting my process,—

Fig. 1 is a plan view of a block-forming grid used in connection with my process. Fig. 2 is a sectional view showing this grid inserted in the pan containing the undried gel with a screen receiver placed thereabove. Fig. 3 is an end part broken-away view of the same parts shown in Fig. 2, but in inverted relation. Fig. 4 shows the position and relation of the formed blocks of gel after the grid former and pan have been removed. Fig. 5 is a plan view of a series of mesh-bottom trays as they are positioned in the open air. Fig. 6 shows a side elevation view of one of the racks for receiving the trays, and Fig. 7 is a cross-section detail showing the manner in which the trays are supported on the rack. Fig. 8 is a plan view of a portion of the canvas material receiving belt removably held in the rack.

The fluid mixture out of which the gel is being formed, is poured into a pan 10, preferably of broad rectangular shape and formed with sloping or beveled side walls 11, after which the inert material, either green sand, ordinary river sand, or other inert material, has been added while the soft gel is forming, being agitated at the same time. A grid 12 is provided which comprises a multiplicity of longitudinal bars 13 and transverse bars 14 of wedge shape, as is clearly indicated at 15 in Fig. 2. This grid is then pressed down through the soft gel until the broad ends of the grid bars rest upon the bottom 16 of the pan 10. The grid and pan remain together in this position for a period of time sufficient to permit gelling solidification of the contents of the pan. After this a tray 17 is placed in inverted position over the top of the pan. This tray has side walls 18, vertical with respect to its mesh bottom 19, the side walls being of a size to just enclose the upper edge of the sloping side walls 11 of the pan 10, in which position the screen 19 is held across the top of the pan 10 and spaced somewhat from the ends of the grid bars 13 and 14 and the material held between the same, as clearly shown at 20 in Fig. 2. With the parts in the position shown in Fig. 2 the pan and tray are inverted and come into the position of Fig. 3, after which the pan 10 and the grid former 12 are withdrawn, leaving the gel in the tray 17 in the form of a multiplicity of blocks 21, as clearly shown in Figs. 4 and 5. In this condition each block is in the form of the frustrum of a pyramid with its large sides engaging the screen 19 and each block separated on each of its sides from every other block by wedge-shaped openings 22. In this way blocks, roughly from one to two inch cubes, are formed having all six sides exposed to the air and with opportunity for the air to circulate through the grid of blocks.

For completion of the process I provide a stand suitably positioned out of doors in a favorable location for obtaining the full day's sunlight and all circulation of air. The stands comprise rows of legs 25, crossbars 26 secured thereto and longitudinal bars 27 resting upon and secured to the crossbars 26. In a preferred form of stand there will be 3 such longitudinal bars spaced apart just so as to receive the ends 18 of the trays 17 and thus provide a double row of such trays, as clearly indicated at 28 on Fig. 5. The stands may be made of any desirable length. The one illustrated in Fig. 5 will hold twenty-eight trays. Obviously longer or shorter stands may be employed in the same manner. The result of the drying process will be the breaking down into granules of considerable parts of the cubes. I provide extending longitudinally of the stand between the legs 25 thereof a removable canvas belt 29, shown in plan in Fig. 8. This canvas belt is provided with a multiplicity of eyelets 30 which are adapted to engage hooks 31 on the inside of the legs 25, thus being removably held about a foot or more below the screen bottoms 19 of the trays 17.

After the material has been formed in the manner above specified and transferred to the screen-bottomed trays and positioned by them upon the stand, it is left in the open air and sunshine for the period requisite to effect sufficient drying thereof, after which the material which remains upon the trays is accumulated in a suitable receptacle, and that which has fallen through upon the canvas is also collected in the same receptacle and the dried material is washed, whereupon it disintegrates into a granular form of the right size, and upon a second superficial drying is ready for the market.

The advantages of my invention have been pointed out in connection with the detailed description thereof. A chief advantage is that there is a slower and more uniform drying under atmospheric conditions than it is possible to obtain with artificial drying. It has heretofore been believed to be impossible to dry this material other than artificially within a closed room. The method of drying herein described is, therefore, in the nature of a discovery, and results in a product which is obtained much more cheaply than by artificial means of drying, and which is very much superior in that the grains are more uniform and harder and there is little or no waste from disintegration or washing away when the material is subjected to currents of water in use.

I claim:

1. A process of producing a base exchanging material which consists in producing an aluminum silica gel material, forming the gel before the same has hardened by drying into a multiplicity of blocks, positioning the blocks spaced one from another so as to permit air circulation around all sides thereof, and exposing the blocks so positioned to outdoor conditions of sun and wind until said blocks have reached a desired condition of dryness.

2. A process of producing a base exchanging material which consists in producing an aluminum silica gel material, forming the gel before the same has hardened by drying simultaneously into a multiplicity of blocks, and simultaneously positioning the blocks spaced one from another so as to permit air circulation around all sides thereof, and exposing the blocks so positioned to outdoor conditions of sun and wind until said blocks have reached a desired condition of dryness.

3. A process of producing a base exchanging material which consists in producing an aluminum silica gel material, forming the gel before the same is hardened by drying into a multiplicity of blocks, simultaneously positioning the blocks spaced one from another upon a perforate screen support, and exposing the blocks on said screen to outdoor conditions of sun and wind circulation until the blocks have reached the desired condition of dryness.

4. A process of producing a base exchanging material which consists in producing an aluminum silica gel material, forming the gel before the same is hardened by drying into a multiplicity of blocks, simultaneously positioning the blocks spaced one from another upon a perforate screen support, exposing the blocks on said screen to outdoor conditions of sun and wind circulation until the blocks have reached a desired condition of dryness, and collecting the dry and disintegrated gel material and washing and again drying the same.

5. A process of producing a base exchanging material which consists in producing an aluminum silica gel material, spreading said gel before the same has hardened within an imperforate container to a depth of from one to two inches, inserting a grid into the container before the gel therein has hardened by drying to form the gel into a multiplicity of blocks, inverting the container upon a tray having a perforate bottom, and withdrawing the container and grid from said tray so as to position the blocks of gel thus formed to permit air circulation around all sides thereof, and thereafter exposing the blocks and their carrying trays to outside conditions of sun and wind until said blocks have reached a desired condition of dryness.

6. A process of producing a base exchanging material which consists of forming a soft gel material by mixing solutions of sodium silicate and sodium aluminate, separating the gel material before it has hardened by drying into a multiplicity of blocks spaced one from the other, and exposing the separated blocks to outdoor conditions of sun and air until said blocks have reached a desired condition of dryness.

In testimony whereof I hereunto affix my signature.

FREDERICK K. LINDSAY.